3,404,150
PROCESS FOR THE ESTERIFICATION OF HYDROXY STEROIDS

Otto Halpern, Palo Alto, Calif., assignor to Syntex Corporation, Panama, Panama, a corporation of Panama
No Drawing. Filed May 25, 1966, Ser. No. 552,713
7 Claims. (Cl. 260—239.55)

This invention relates to a new and novel process for the preparation of cylcopentanophenanthrene derivatives.

More specifically, the present invention pertains to a process for the esterification of hydroxy steroids.

Esterified hydroxy steroids are of recognized value in the art. Thus, hydroxy steroids are often esterified for purposes of protection during chemical transformations. Moreover, many esterified steroids are known to be valuable therapeutic agents as for example, testosterone propionate, testosterone cyclopentyl propionate, 17α-hydroxyprogesterone caproate, chlormadinone acetate, ethynodiol diacetate, and so forth.

Generally, primary and secondary hydroxy groups are readily esterified with hydrocarbon carboxylic acid anhydrides, such as acetic anhydride, in the presence of a weak acidic catalyst such as benzenesulfonic acid or an organic base like pryidine. However, the conditions required for esterification of tertiary hydroxy groups are much more limited and rigorous than those required for the other types of hydroxy groups. Generally, tertiary hydroxy groups are only esterified by prolonged treatment with hydrocarbon carboxylic acid anhydride in the presence of a strong acid catalyst, such as concentrated sulfuric acid, p-toluenesulfonic acid and the like, at elevated temperatures. Under such conditions, undesirable side reactions often occur, such as dehydration.

The process of the present invention permits hydroxy groups, primary, secondary and tertiary, to be esterified at moderate temperatures in relatively short periods of time, depending upon the difficulties of the esterification due to such conditions as steric hinderance effects, polarity of adjacent or near adjacent groups, to the hydroxy group, and so forth.

For purposes of the present invention, it is to be understood that hydroxy steroids are those steroids of the androstanes, pregnane, cholestanes and cholanes series and their appropriate 19-nor analogs, in which the steroids have one or more hydroxy groups attached to the steroid nucleus or to a side chain attached to the steroid nucleus. Moreover, the term hydroxy groups includes as well enolizable keto groups, as is more fully discussed hereafter.

The hydrocarbon carboxylic acyl groups of the hydrocarbon carboxylic acid anyhdrides of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, halogeno, and the like. Typical anhydrides thus include acetic, propionic, enanthic, caproic, cyclopentylpropionic, dichloroacetic, β-chloropropionic anhydride, and the like.

The process for the present invention is carried out by adding the hydroxy steroid to a mixture containing a 2 or more molar excess (per hydroxy group) of the appropriate carboxylic acid anhydride and a catalytic amount of elemental iodine. Preferably, the hydroxy steroid is treated with about a 25 to about a 100 molar excess of the acid anhydride but larger or smaller excesses can be used. The above mixture is allowed to react for a period of time ranging from about a half of a minute to about six hours or more, and preferably from one to ten minutes. During this period, the mixture can be stirred.

The process carried out at a temperature ranging from about −50° C. to about 250° C., and preferably from about 10° C. to about 30° C. The reaction is carried out under anhydrous conditions and optionally under a dry, inert gas, such as nitrogen, argon and so forth.

By catalytic amount of iodine, it is to be understood that for purposes of the present invention, this means about 0.001 to about 10.0 mole equivalents, and preferably 0.1 to 2.0 mole equivalents of iodine per mole equivalent of hydroxy steroid. At the end of this time, the esterified hydroxy steroid is isolated and purified in a conventional manner. For example, at the completion of the process, the excess hydrocarbon carboxylic acyl anhydride is consumed by pouring the reaction mixture into a mixture of ice and water. This resulting mixture is extracted with an inert, organic solvent such as methylene chloride, diethyl ether, or the like; the extract is washed with an aqueous sodium bicarbonate solution and washed to neutrality, dried and evaporated to dryness and the resulting esterified steroid can be recrystallized or chromatographed if necessary.

A further advantage of this process is that under its conditions, enolizable keto groups are shifted to the enol form wherein the enol hydroxy group is esterified as readily as the hydroxy groups, thus forming enol esters.

The enolizable keto groups can be regenerated from the enol esters by a conventional mild acid hydrolysis. For example, the enol ester of a steroid can be hydrolyzed by refluxing the steroid in a non-aqueous methanol solution containing 1 to 2% hydrogen chloride by weight. At the completion of the hydrolysis, the hydrogen chloride is neutralized with an aqueous sodium carbonate solution, and the reaction mixture is evaporated to dryness. The residue is extracted with an inert, organic solvent such as methylene chloride; the extract is washed with water to neutrality, dried and evaporated. The keto steroid can then be recrystallized or chromatographed if necessary.

Hydroxy steroids such as

17α-ethynyl-17β-hydroxyandrost-4-en-3-one;
17α-ethynyl-17β-hydroxyestr-5(10)-en-3-one;
6-fluoro-17α-hydroxypregna-4,6-diene-3,20-dione;
17α-ethynylestra-1,3,5(10)-triene-3β,17β-diol;
estra-1,3,5(10)-triene-3β,17β-diol;
6α-methyl-17α-hydroxypregn-4-ene-3,20-dione;
1α,2α-methylene-6-chloro-17α-hydroxypregna-4,6-diene-3,20-dione;
9α-fluoro-11β,17α,21-trihydroxy-16α-methylpregna-1,4-diene-3,20-dione;
6α-fluoro-11β,17α,21-trihydroxy-16α-methylpregna-1,4-diene-3,20-dione;
6α,9α-difluoro-11β,21-dihydroxy-16α,17α-isopropylidene-pregna-1,4-diene-3,20-dione;
6α-fluoro-17α,21-dihydroxy-16α-methylpregna-1,4-diene-3,11,20-trione, and the like can be fully esterified into the corresponding ester steroids by the process of the present invention.

In order that those skilled in the art may more fully understand the present invention, the following examples are presented as illustrations. In no way should these examples be construed as limitations of the present invention.

EXAMPLE 1

Fifty milligrams of 17α-ethynyl-17β-hydroxyestr-4-en-3-one are added to 1 ml. of acetic anhydride containing 50 mg. of iodine. The mixture is allowed to stand for 2 minutes at room temperature, and then added to a mixture of 10 ml. of water, and 10 g. of ice. The resulting mixture is extracted with methylene chloride; the extract is washed with an aqueous 5% sodium bicarbonate solution and then with water to neutrality; then the extract is dried and evaporated to yield 3,17β-diacetoxy-17α-ethynylestra-3,5-diene which is recrystallized from acetone: hexane.

EXAMPLE 2

By following the procedure of Example I, but using 6 - chloro - 17α-ethynyl-17β-hydroxyestra-4,6-dien-3-one as a starting material and replacing acetic anhydride with caproic anhydride, 3,17β-dicaproxy-6-chloro-17α-ethynylestra-3,5,7-triene is formed.

EXAMPLE 3

By following the procedure of Example I, but using 3β,5α,6β - trihydroxy - 23,24 - bisnorcholan-22-oic acid methyl ester as a starting material, 3β,5α,6β-triacetoxy-23,24-bisnorcholan-22-oic acid methyl ester is formed.

EXAMPLE 4

Into a solution containing 16 ml. of acetic anhydride and 250 mg. of iodine, 3.5 g. of 6-chloro-17α-hydroxy-pregna-4,6-diene-3,20-dione are added. The resulting suspension is stirred for 6 minutes at 25° C. and then 60 ml. of ice cold water is added. The mixture is extracted with methylene chloride, washed with an aqueous 5% sodium bicarbonate solution and washed with water to neutrality, dried and evaporated to yield 3,17α-diacetoxy-6-chloro-pregna-3,5,7-trien-20-one.

EXAMPLE 5

Seven grams of 6α - methyl-17α-hydroxypregn-4-en-3,20-dione are added to a solution consisting of 65 ml. of propionic anhydride and 51 mg. of iodine. The mixture is stirred and allowed to stand for 2 minutes at 23° C. 250 ml. of ice cooled water is then added and the solid is filtered off. The solid is dissolved in methylene chloride, washed with an aqueous sodium carbonate solution and water to neutrality, dried, and evaporated to dryness. The resulting 3,17α - dipropionoxy-6-methylpregna-3,5-dien-20-one is recrystallized from acetone:hexane.

EXAMPLE 6

Two hundred and seventy-five grams of iodine are added to a mixture consisting of 650 g. of 17α-hydroxy-pregn-4-ene-3,20-dione in 15 l. of acetic anhydride. The mixture is vigorously stirred for 10 minutes at 30° C. and then added to a stirred mixture of 25 l. of water and 25 kilograms of ice. The solid that forms is removed from the aqueous solution by filtration. The solid is then dissolved in 3 l. of chloroform, washed with an aqueous sodium thiosulfate solution to remove the iodine, and then washed with sodium bicarbonate and water to neutrality. The chloroform solution is dried and evaporated to dryness to yield 3,17α - bisacetoxypregna-3,5-dien-20-one.

EXAMPLE 7

To a solution consisting of 25 ml. of propionic anhydride and 10 mg. of iodine, 1 g. of 17α-ethynylestr-5-ene-3β,17β-diol is added. The solution is allowed to sit for 5 minutes at 23° C. and is then added to 50 ml. of water containing 50 g. of ice. The mixture is extracted with methylene chloride, the extracts are washed with a 5% potassium carbonate solution and water to neutrality, then dried and evaporated to dryness. The resulting 3β,17β - bispropionoxy - 17α-ethylnylestr-5-ene is recrystallized from acetone:pentane.

EXAMPLE 8

Using the procedure of Example 7, but replacing propionic anhydride with dichloroacetic anhydride, 3β,17β-bischloroacetoxy-17α-ethynylestr-5-ene is formed.

EXAMPLE 9

Following the procedure of Example 7, but using 17β-hydroxy - 17α-chloroethynylestr-4-en-3-one as a starting material and replacing 25 ml. of propionic anhydride with 75 ml. of caproic anhydride, 3,17β - biscaproxy-17α-chloroethynylestra-3,5-diene is formed.

EXAMPLE 10

One gram of 3,17β-diacetoxy-17α-vinylestra-3,5-diene is added to a solution of 250 ml. of non-aqueous methanol containing 5 ml. of concentrated hydrochloric acid. The resulting solution is refluxed under anhydrous conditions for 1 hour. It is then cooled, neutralized with an excess of aqueous 10% potassium carbonate solution and evaporated to dryness. The residue is extracted with methylene chloride; the extract is washed with water to neutrality, dried over magnesium sulfate and evaporated to dryness. The resulting 17α-vinyl-17β-acetoxyestr-4-en-3-one is recrystallized from acetone:hexane. In a similar manner, the other enol acylate steroids formed in the above examples can be regenerated into their respective keto steroids.

What is claimed is:

1. A process for the esterification of hydroxy steroids which comprises treating the steroid with at least a 2 molar excess of a hydrocarbon carboxylic acyl anhydride under anhydrous conditions in the presence of a catalytic amount of iodine at a temperature ranging from about −50° C. to about +250° C.

2. The process according to claim 1 wherein the steroid is treated with about a 25 to about a 100 molar excess of hydrocarbon carboxylic acid anhydride.

3. The process according to claim 1 wherein the steroid is treated with about 0.1 to about 2.0 mole equivalents of iodine per mole equivalent of hydroxyl function of the steroid.

4. The process according to claim 1 wherein the temperature ranges from about +10° C. to about +30° C.

5. The process according to claim 1 wherein the hydroxy steroid is treated with about 25 to about 75 mole equivalents of hydrocarbon carboxylic acid anhydride in the presence of about 0.1 to about 2.0 mole equivalents of iodine per mole equivalent of steroid at a temperature ranging from about +10° C. to about +30° C.

6. The process according to claim 1 wherein the hydrocarbon carboxylic acid anhydride is selected from a group consisting of acetic anhydride, propionic anhydride and caproic anhydride.

7. The process according to claim 5 wherein the hydrocarbon carboxylic acid anhydride is acetic anhydride.

References Cited

FOREIGN PATENTS 665,540   6/1963   Canada.

LEWIS GOTTS, *Primary Examiner.*

E. G. LOVE, *Assistant Examiner.*